INVENTOR
JAMES H. MILLER

BY

ATTORNEYS

United States Patent Office 3,528,542
Patented Sept. 15, 1970

3,528,542
BATTERY CONTAINERS
James H. Miller, Minneapolis, Minn., assignor to Gould-National Batteries, Inc., St. Paul, Minn., a corporation of Delaware
Filed Nov. 29, 1968, Ser. No. 779,681
Int. Cl. H01n 1/02
U.S. Cl. 206—2                7 Claims

ABSTRACT OF THE DISCLOSURE

A plastic battery container having precurved end wall sections for engaging lead-ins on a plastic battery cover so as to guide the edges of the container into matching grooves in the cover.

BACKGROUND OF THE INVENTION

Field of the invention

This invention generally pertains to plastic storage batteries and, more specifically, to end wall construction of plastic storage batteries.

Description of the prior art

Typically, battery containers have been made from such materials as wood, hard rubber and more recently plastics such as polypropylene. While it is desirable to assemble these plastic batteries by heat sealing the plastic cover to the plastic container, it is also difficult to align the edges of the cover and the container for the heat sealing process. Typically, the plastic batteries are constructed of relatively thin rigid sections of material such as the aforementioned polypropylene. The container is substantially rectangular and comprises a pair of end walls, a pair of side walls and a bottom member. Located within the container are a plurality of vertical, parallel, cell partitions for holding the individual cells of the storage battery. The walls and bottom member are formed in a single molding operation to create a fluid tight container. Similarly, the battery cover is molded from the same material as the container.

After the container and cell partitions are formed the plates and necessary terminals are inserted into the container and the cover is heat sealed to the topmost portion of the container side walls, the container end walls and the intercell partition wall. A series of lead-ins located on the cover guide the top portion of the container walls into a plurality of grooves located in the cover.

When the containers are molded in a single piece the end wall portions of the container do not always remain vertical after the molding process but randomly bow inward or outward. As the side walls are reinforced by the partition walls they do not tend to bow but remain vertical to the bottom member. In order to minimize the distortion of the end wall section there is provided a series of ribs located therein which act as a stiffener to the thin end wall sections. However, the ribs while acting as stiffeners do not prevent the end wall from randomly bowing inward or outward. In plastic battery covers of this type there is also provided slanted tabs or lead-ins for guiding the edge of the container into the grooves in the cover. Along the inside of the battery cover there is provided a single lead-in but on the outside of the cover there is no lead-in as it is desired to have the outside of the battery container and cover smooth, while for the intercell partitions there are provided two lead-ins to guide the partitions into the cover grooves as it is not necessary to have the intercell walls smooth. Also because the battery industry has established standard outside sizes for various battery groups, it is desirable to have the outside of the battery conform to those dimensions without having any unnecessary flanges or ridges for lead-ins that would lengthen the battery beyond the particular group dimensions.

With plastic containers of this type a slight outward bow of the container wall makes it difficult to guide the edges of the container into the grooves in the cover. Numerous prior art methods have been attempted to solve this problem. One prior art method is to manufacture the battery container from a different material which is more rigid and does not produce the random bowing of the walls. Another method is to insert steel members into the wall to stiffen the wall to ensure that is remains vertical to form a good tight sealing relation with the cover. Another method is to make the end wall sections considerably thicker than the side walls so that they will remain rigid because of their own thickness. Another method is to place a fixture adjacent the plastic battery container to hold the walls vertical so the container can be slid into the groups of the cover. These prior art methods all have disadvantages in that they are either too costly to be competitive or require additional fixtures which are difficult to incorporate into the complex heat sealing equipment. In addition, even if the end walls are vertical prior to assembly, once the cover and container are assembled and filled the force of the liquid electrolyte and the electrode plates in the cell tend to bow out the end walls. The bowed out end walls give the container a bulging, unsightly appearance. Generally, a stigma attaches to goods having a bulged appearance. For example, if the top of a food can bulges outward it is a sign that the goods in the can are spoiled and if a dry cell bulges outward it is a sign of deterioration of the cell. Thus, this stigma has a direct influence on the consumer who generally associates a bulging container with a faulty or spoiled item.

Therefore, it is a necessity to eliminate the bulging end wall in the assembled container in addition to ensuring that the cover and the container can be properly heat sealed. It has been discovered that by having the end walls bow inward prior to assembly eliminates the bulgeness after assembly, as the liquid electrolyte and plates force the end walls into a vertical position. Thus, the present invention solves a two-fold problem by eliminating the bulging appearance of the container while also providing a low cost container that is suitable for mass production assembling techniques. The present invention incorporates a pre-formed inward bow in the end wall. It has been discovered that the ribs on the end walls or the thicker end wall or possibly both coact producing a container having end walls that have a preferred inward bow. In order to obtain the inward bowed end walls the battery container end cells are made slightly larger than the rest of the cell so that the end cell can accommodate slightly larger reinforcing ribs and a slightly thicker end wall section with the same number of plates used in the inner cells. By manufacturing the battery with thicker end walls and placing ribs along the inside of the end walls of the battery to produce an inward bow in the end wall, it ensures that the container end walls will smoothly follow the single lead-in on the container into the grooves at the edges of the cover. Obviously, if one of the end walls bowed outward during the heat sealing and assembly process, the topmost portion of the container end wall would jam on the cover destroying the cover and container.

BRIEF SUMMARY OF THE INVENTION

Briefly, the invention comprises forming a battery container with oversized end cell partitions, thicker end wall sections and ribs so as to create inward bowed end walls.

DESCRIPTION OF THE PREFERRED EMBODIMENT

Figure 1:
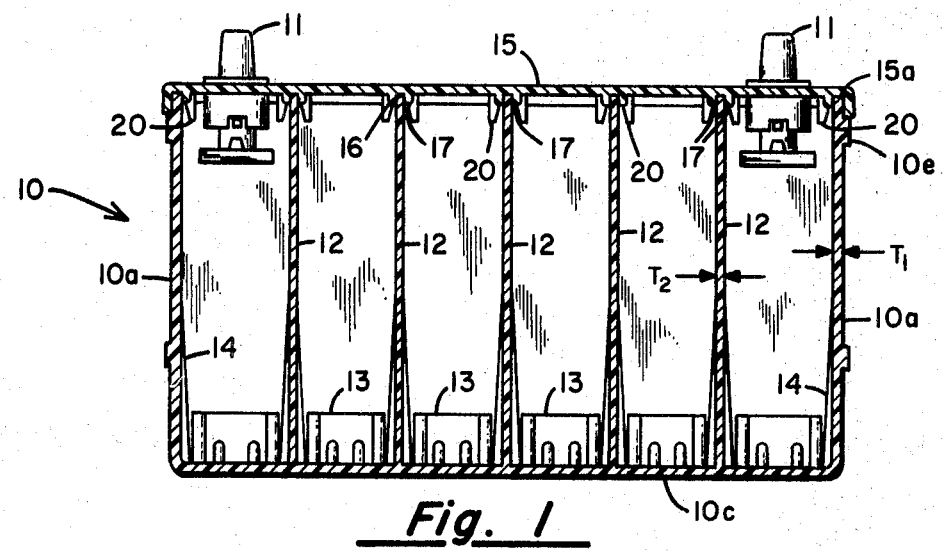
FIG. 1 is a sectional side view of an assembled battery showing how the inward bowed end walls have straightened out after assembly.
Figure 2:
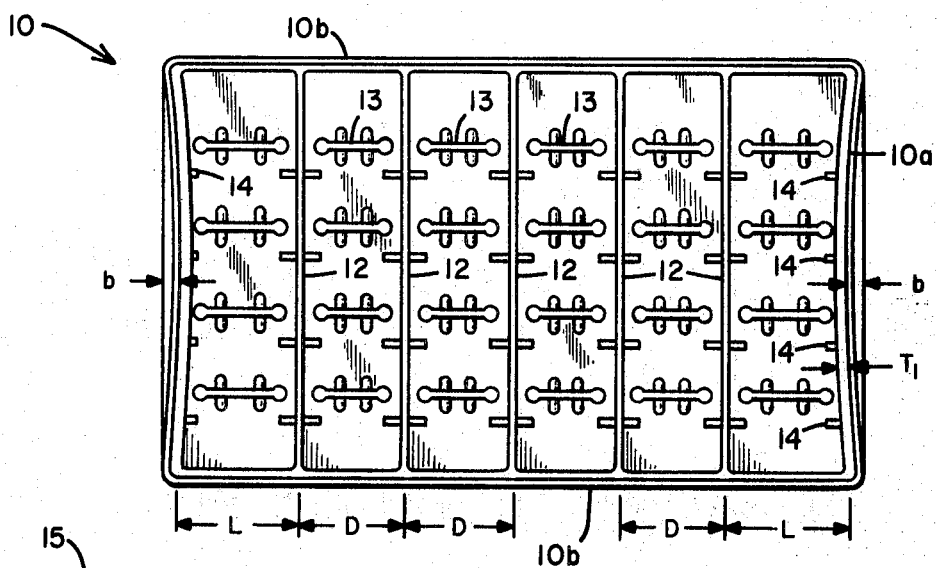
FIG. 2 is a top view of the battery container showing the inward bowed end walls prior to assembly.

FIG. 1 and FIG. 2 show a conventional boxlike storage battery container 10 which is used, for example, in the automotive field having a negative and positive battery terminal post 11 extending through a cover 15. Container 10 comprises end walls 10a, side walls 10b and a bottom member 10c and a group of vertical, parallel, cell partitions 12. The members are all formed in a single molding operation so as to produce an integral leakproof container. (The process for molding the container does not constitute part of the instant invention so it will not be described herein.) Located at the top of container 10 is a ridge 10e for engaging the lower edge of cover 15. Located at the bottom of the container are supporting ridges 12 and also ribs 14 for reinforcing and strengthening wall members 10a, 10b and 12. The bottom edges of the negative and positive plate separators (not shown) rest on the top of ridges 13. By integrally forming supporting ridges 13 to the bottom member 10c with no connection to the cell partitions 12, it allows partition walls 12 to be made thinner to increase the useful battery volume within the container without loss of strength.

Battery container cover 15 is made from the same polypropylene material as container 10 but it is molded separately from the cover for ease in molding and assembling the battery insides. Cover 15 is joined to the outer container walls 10a and 10b along grooves 16 located along the perimeter and across the bottom of cover 15. The inside grooves 16 in cover 15 are formed by ridges 17 that extend across the battery cover and parallel to the cell partition walls to coact in making a liquid tight closure between adjacent cells. End walls 10a and the partition walls 12 have tapered supporting ribs 14 which provide additional strength. In addition, the end walls 10a are slightly tapered on the inside so that the cross sectional dimension increases from the top of the container to the bottom of the container. The thickness of the end wall containers is designated by reference numeral $T_1$ and the typical thickness of .070 inch. The partition wall thickness is designated by reference numeral $T_2$ and a typical thickness is .060 inch. These dimensions are given for illustrative purposes and no limitation is intended thereto. In order to ensure that the upper edges of the walls seat properly within their respective grooves, there are provided lead-in members 20 on the underside of battery cover 15. Lead-in members 20 are integrally formed on the cover and are spaced at selected intervals along grooves 16. Lead-in members 20 extend downward and flare outward from ribs 17. The lead-ins may take any variety of forms, sizes or shapes; for example, they may be in the form of tabs or rods extending downward and cut diagonally. The ribs 17 can also be V-shaped or the like to guide the edges of the container into the cover. To insure a liquid tight seal between the walls and the cover it is necessary that the upper edges of the walls seat positively in their respective grooves, not only to prevent electrolyte from leaking out of the battery container but also to prevent electrolyte from leaking between adjacent cells in the container.

In order to heat seal the cover to the container one preheats the upper edges of the container walls and the corresponding grooves on the underside of the cover and then quickly joins them together under pressure. It is important that these preheated areas be brought together quickly to minimize heat loss in order to provide a leakproof joint between the cover and the container. Lead-ins 20 help to ensure that the upper edges of the container can be quickly guided into place. Obviously, if the covers must be rapidly placed on the container the lead-ins must guide all of the edges of the container into the grooves of the cover. With prior art plastic "battery" containers the end walls randomly bow inward or outward. As there is only one set of lead-ins on the outside of the battery cover, it is apparent that if the end walls bow outward they will jam against the cover as it is lowered onto the container. This obviously ruins the battery. As previously mentioned, to provide a lead-in on the outside of the battery container it would require lengthening the battery beyond standard industry sizes or shortening the inside dimensions of the battery. To lengthen the battery is undesirable because these batteries are generally made according to industry established group sizes to fit into various types of machinery. Also, to have a lead-in on the outside would require a bulky skirt along the cover or something of a similar nature to act as a lead-in which would also be undesirable. To ensure proper engagement of the cover and the container with a single lead-in, it is necessary that the end walls be vertical or slightly bowed inward so they will slide into the cover grooves. This problem is peculiar to the end walls as the side walls are prevented from bowing outward by the partition walls extending across the battery. However, the end walls do not have similar support. I have discovered that by forming the end walls slightly thicker than the partition walls and side walls and by placing ribs 14 on the inside of container wall 10a, it consistently provides an inward bow in the end walls of the container. Whether the inward bow is produced by the thicker wall or the ribs or possibly the coaction of both it is not thoroughly understood at this time.

Referring to FIG. 2, the distance of the maximum inward bow which occurs at the top of the container is designated by reference letter b. It has been found that a maximum inward bowing distance b of approximately .080 inch is desirable to ensure proper lead-in and also to compensate for the expansion of the cell as the electrolyte and the groups of lead plates are inserted therein. FIG. 1 shows the assembled battery and the vertical or straight appearance of the end walls which produces a pleasing appearance. In contrast, if the thin end wall sections were vertical prior to assembly they would bulge outward producing the undesirable bulges.

In order to use a thicker end wall to obtain the necessary bowing of the end wall, I have also slightly varied the size of the end cells. Typically, the end cell has a width designation by reference letter L equal to 1.491 inches and interior cells have a width from wall to wall designated by reference letter D of 1.428 inches. The larger end cells are provided so that the ribs in the end cells can be made slightly thicker and the end wall sections can also be made slightly thicker while still accommodating the same number of plates in the battery.

Referring to FIG. 2, the battery end walls 10a are shown in the unassembled condition. Note, the end walls bow inward from a vertical plane a maximum distance denoted by b. This maximum distance occurs at the central topmost portion of the cell and gradually decreases toward the edges and sides of the end wall. With bowed-in end walls as shown in FIG. 2 the assembly of the cover and the container can be smoothly done.

Figure 3:
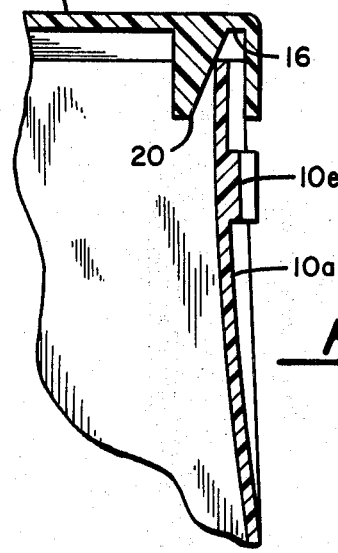
FIG. 3 shows a portion of the battery end wall for a battery during assembly of the cover and the container.

Referring to FIG. 3, there is shown a partial cross sectional view through a corner of the cover and the container. This view shows the top edge of the container end wall 10a slidably engaging lead-in 20. Continued downward motion of cover 16 causes end wall 10a to be guided into the sealed position shown in FIG. 1. In the sealed and assembled portion end walls 10 have a smooth vertical appearance.

I claim:
1. A plastic battery container suitable for forming a sealed relation with a plastic cover comprising: a bottom member; a pair of parallel spaced side walls extending from said bottom member in a fluid tight relation, said side walls having a thickness $T_2$; a pair of end walls extending from said bottom member and said side walls in a fluid tight relation so as to form a container for an electrolyte, said end walls having a thickness $T_1$; which is greater than said side wall thickness $T_2$; a plurality of ribs located along the inside and attached to said end walls, said thickness of said end walls and said ribs coacting to produce inward bowed end walls.

2. The invention as described in claim 1 wherein the maximum distance said end wall bows inward from a vertical plane projecting upward from said bottom member does not exceed .080 inch.

3. The invention as described in claim 1 wherein a plurality of end intercell partitions and interior cell partitions are provided in said container, said end intercell partitions forming cells having a length denoted by L and said interior cell partitions forming cells having a length denoted by D wherein said length L is greater than said length D.

4. The invention as described in claim 1 wherein a cover is provided having a plurality of grooves and a plurality of lead-ins for slidably engaging and directing said container end walls into said grooves in said cover.

5. The method of making a plastic battery comprising the steps of:
  (a) forming a container having inwardly bowed end walls;
  (b) forming a cover having a plurality of lead-ins and container engaging grooves; and
  (c) placing said cover onto said container in a sealing relation.

6. The method of claim 5 including forming side walls of a thickness $T_2$ and forming end walls of a thickness $T_1$ being greater than said side walls thickness $T_2$.

7. The method of claim 6 including the step of forming ribs on said end wall.

References Cited
UNITED STATES PATENTS

| | | | |
|---|---|---|---|
| 1,487,424 | 3/1924 | Ahlgren | 206—2 |
| 1,558,384 | 10/1925 | Mattson | 206—2 |
| 2,316,296 | 4/1943 | Simonds | 220—72 |
| 3,388,007 | 6/1968 | Fiandt | 136—166 |

DONALD F. NORTON, Primary Examiner

U.S. Cl. X.R.

136—176; 150—0.5; 156—69; 220—72